(12) United States Patent
Li et al.

(10) Patent No.: US 11,946,542 B1
(45) Date of Patent: Apr. 2, 2024

(54) ELECTRIC VEHICLE TRANSMISSION CONTROL STRATEGY

(71) Applicant: GM Global Technology Operations LLC, Detroit, MI (US)

(72) Inventors: Dongxu Li, Troy, MI (US); Chunhao J. Lee, Troy, MI (US); Thomas Weglarz, Farmington Hills, MI (US); Su-Yang Shieh, Clawson, MI (US); Paul Guillermo Otanez, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/984,450

(22) Filed: Nov. 10, 2022

(51) Int. Cl.
*F16H 59/44* (2006.01)
*B60L 15/20* (2006.01)
*F16H 59/18* (2006.01)
*F16H 61/28* (2006.01)

(52) U.S. Cl.
CPC .......... *F16H 61/2807* (2013.01); *B60L 15/20* (2013.01); *F16H 59/18* (2013.01); *F16H 59/44* (2013.01)

(58) Field of Classification Search
CPC ...... F16H 59/18; F16H 59/44; F16H 61/2807; B60L 15/20
See application file for complete search history.

(56) References Cited

U.S. PATENT DOCUMENTS

| | | | |
|---|---|---|---|
| 2003/0137275 A1* | 7/2003 | Suzuki | B60L 3/0046 320/104 |
| 2012/0310497 A1* | 12/2012 | Haneda | F16H 61/0213 701/52 |
| 2016/0185336 A1* | 6/2016 | Ueno | B60W 10/115 180/65.265 |
| 2018/0015928 A1* | 1/2018 | Koguchi | F16H 61/0213 |
| 2020/0362961 A1* | 11/2020 | Harada | F16H 61/0021 |

* cited by examiner

*Primary Examiner* — Edwin A Young
(74) *Attorney, Agent, or Firm* — CANTOR COLBURN LLP

(57) ABSTRACT

A system and method for operating an electric vehicle. In another exemplary embodiment, a system for operating an electric vehicle is disclosed. The system includes a first motor and a transmission coupled to the first motor. The transmission is configured to shift gears when a speed of the electric vehicle crosses a shift threshold. The shift threshold is independent of a position of an acceleration pedal of the electrical vehicle.

20 Claims, 9 Drawing Sheets

ELECTRIC VEHICLE TRANSMISSION CONTROL STRATEGY

INTRODUCTION

The subject disclosure relates to strategies for shifting gears in a transmission of an electric vehicle and, in particular, to a simplified gear shifting strategy based on vehicle speed.

An electric vehicle includes an electric motor that generates a motor torque and a transmission that transfers the motor torque to an axle of the vehicle. An electric motor has a broad operating range and therefore requires fewer gear states, thereby allowing for a simplified transmission design. However, the quality of a gear shift can be affected by an amount of acceleration at the vehicle. Accordingly, it is desirable to provide a method for controlling a gear shift operation that maintains a quality of the gear shift operation.

SUMMARY

In one exemplary embodiment, a method of operating an electric vehicle is disclosed. A gear shift is performed at a transmission of the electric vehicle when a speed of the electric vehicle crosses a shift threshold. The shift threshold is independent of a position of an acceleration pedal of the electrical vehicle. The transmission is associated with a first motor of the electric vehicle.

In addition to one or more of the features described herein, the shift threshold further comprises an upshift threshold defining an upshift speed and downshift threshold defining a downshift speed that is less than the upshift speed. The method further includes performing an upshift in one a first mode when the position of the acceleration pedal is less than a first pedal threshold, a second mode when the position of the acceleration pedal is greater than the first pedal threshold and less than a second pedal threshold, and a third mode when the position of the acceleration pedal is greater than the second pedal threshold. The first mode further includes offloading torque entirely from the first motor to a second motor, the second mode includes offloading some but not all torque from the first motor to the second motor, and the third mode includes no offloading of torque. The method further includes performing the upshift in the first mode using one of shifting through neutral and shifting through clutch. The method further includes performing a downshift by shifting through neutral with no torque at the first motor. Performing the downshift further includes shifting through neutral includes using regenerative braking.

In another exemplary embodiment, a system for operating an electric vehicle is disclosed. The system includes a first motor and a transmission coupled to the first motor configured to shift gears when a speed of the electric vehicle crosses a shift threshold, wherein the shift threshold is independent of a position of an acceleration pedal of the electrical vehicle.

In addition to one or more of the features described herein, the shift threshold further includes an upshift threshold defining an upshift speed and downshift threshold defining a downshift speed that is less than the upshift speed. The transmission is further configured to perform an upshift in one a first mode when the position of the acceleration pedal is less than a first pedal threshold, a second mode when the position of the acceleration pedal is greater than the first pedal threshold and less than a second pedal threshold, and a third mode when the position of the acceleration pedal is greater than the second pedal threshold. The first mode further includes offloading torque entirely from the first motor to a second motor, the second mode includes offloading some but not all torque from the first motor to the second motor, and the third mode includes no offloading of torque. The transmission is further configured to perform the upshift in the first mode using one of shifting through neutral and shifting through clutch. The transmission is further configured to perform a downshift by shifting through neutral with no torque at the first motor. The transmission is further configured to perform the downshift by shifting through neutral using regenerative braking.

In yet another exemplary embodiment, an electric vehicle is disclosed. The electric vehicle includes a first motor and a transmission coupled to the first motor configured to shift gears when a speed of the electric vehicle crosses a shift threshold, wherein the shift threshold is independent of a position of an acceleration pedal of the electrical vehicle.

In addition to one or more of the features described herein, the shift threshold further includes an upshift threshold defining an upshift speed and downshift threshold defining a downshift speed that is less than the upshift speed. The transmission is further configured to perform an upshift in one a first mode when the position of the acceleration pedal is less than a first pedal threshold, a second mode when the position of the acceleration pedal is greater than the first pedal threshold and less than a second pedal threshold, and a third mode when the position of the acceleration pedal is greater than the second pedal threshold. The first mode further includes offloading torque entirely from the first motor to a second motor, the second mode includes offloading some but not all torque from the first motor to the second motor, and the third mode includes no offloading of torque. The transmission is further configured to perform the upshift in the first mode using one of shifting through neutral and shifting through clutch. The transmission is further configured to perform a downshift by shifting through neutral with no torque at the first motor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
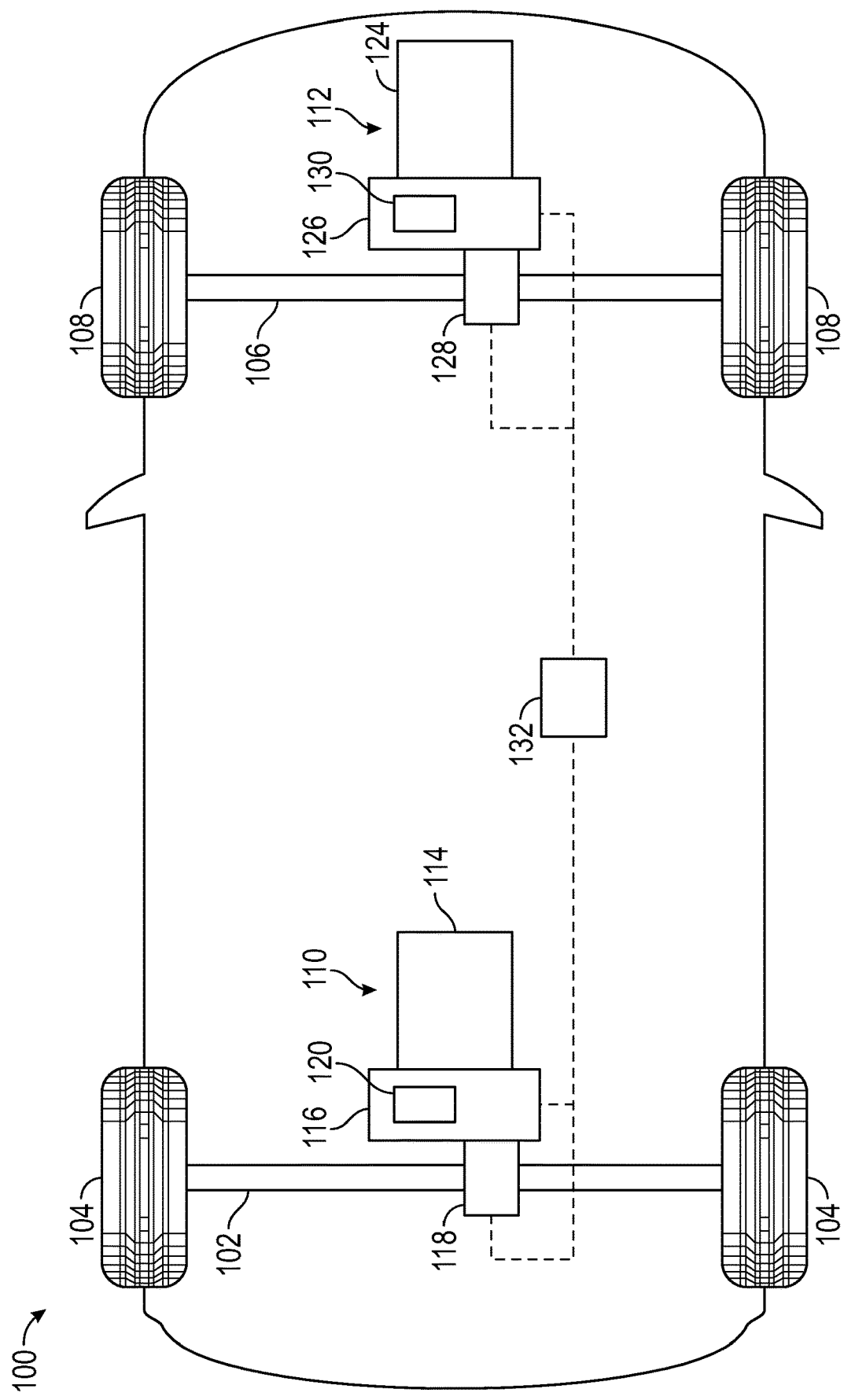
FIG. 1 shows a schematic diagram of an electric vehicle in a plan view, in an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a schematic diagram of an electric vehicle 100 in a plan view. The electric vehicle includes a first axle (rear axle 102) that connects rear tires 104 and a second axle (front axle 106) that connects front tires 108. A first drive system 110 provides power to the rear axle 102, and a second drive system 112 provides power to the front axle 106. The first drive system 110 can include a first battery (rear battery 114), first motor (rear motor 116), and first transmission (rear transmission 118). The rear motor 116 is an electric motor that converts power from the rear battery 114 into kinetic energy in the form of a rotation. The rear transmission 118 can engage the rear motor 116 to transfer the rotation from the rear motor to the rear axle 102 and rear tires 104. The rear motor 116 can include a first regenerative braking system 120. During braking, the first regenerative braking system 120 converts rotational energy of the rear axle 102 into electrical energy or current which is used to recharge the rear battery 114.

Similarly, the second drive system 112 can include a second battery (front battery 124), second motor (front motor 126), and second transmission (front transmission 128). The front motor 126 is an electric motor that converts power from the front battery 124 into kinetic energy in the form of a rotation. The front transmission 128 can engage the front motor 126 to transfer the rotation to the front axle 106 and front tires 108. The front motor 126 can include a second regenerative braking system 130. During braking, the second regenerative braking system 130 converts rotational energy of the front axle 106 into electrical energy or current which is used to recharge the front battery 124. In an embodiment, the second drive system 112 can be engaged when the vehicle is placed in an all-wheel drive mode and can be disengaged or shut down when not in the all-wheel drive mode.

While the electric vehicle 100 of FIG. 1 shows two drive systems, it is understood that there can be additional drive systems for different embodiments of the vehicle. In various applications, the rear axle can have multiple drive systems and/or the front axle can have multiple drive systems. Additionally, it is understood that the rear battery 114 and the front battery 124 can be replaced by a single battery that powers both the rear motor 116 and the front motor 126.

A controller 132 is in communication with the first drive system, including the first motor and first transmission, and the second drive system, including the second motor and second transmission. The controller 132 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 132 may include a non-transitory computer-readable medium that stores instructions which, when processed by one or more processors of the controller 132, implement a method of controlling shifting of gears of at least one of the first transmission and the second transmission, according to one or more embodiments detailed herein.

Figure 2:
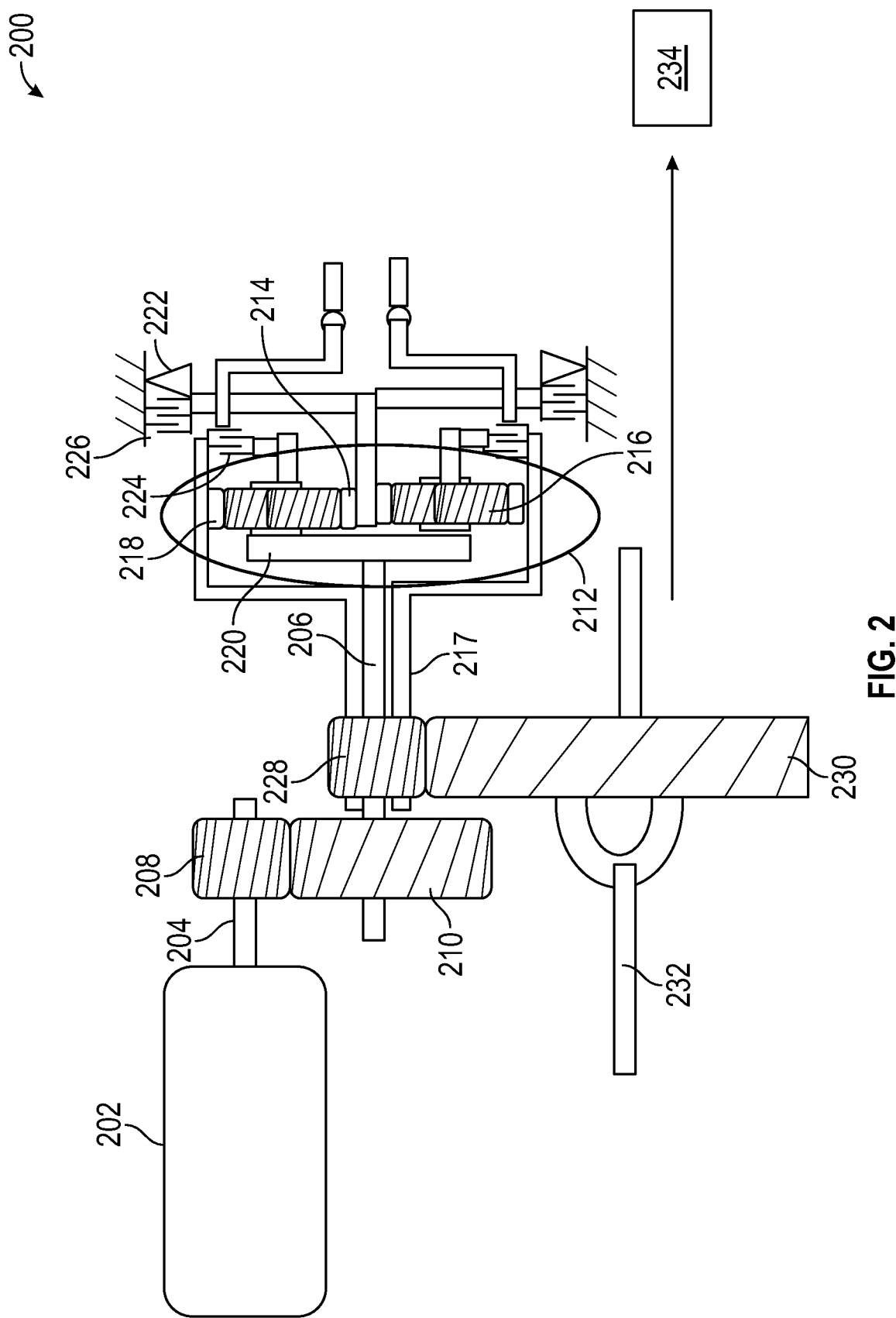
FIG. 2 shows a schematic view of a drive system of the electric vehicle, in an illustrative embodiment.

FIG. 2 shows a schematic view 200 of a drive system of the electric vehicle, in an illustrative embodiment. A motor 202 rotates to creates a torque along a motor shaft 204. This torque can be transferred to a clutch shaft 206 by gears 208 and 210. The torque along the clutch shaft 206 produces a rotation at planetary gear set 212. As shown in FIG. 2, the planetary gear set 212 is a compound gear set including a sun gear 214, planetary gears 216, ring gear 218 and carrier 220. The ring gear 218 is coupled to a torque transfer component 217 that transfers torque from the ring gear 218 to a first drive gear 228. A first clutch 222, also referred to herein as a one-way clutch (OWC) controls a connection between the sun gear 214 and a ground or immobile state. The OWC can transfer torque in only one direction (a "positive" direction). For a rotation in the positive direction, if the speed of the motor 202 is reduced or brought to zero, the OWC can continue to rotate, thereby storing the rotational energy imparted to it by the motor. A second clutch 224 engages or disengages the ring gear 218 to the carrier 220 of the planetary gear set 212.

The planetary gear set 212 can operate to provide a first gear ratio and a second gear ratio for torque transfer. The first gear ratio is a non-unitary gear ratio (i.e., not a 1:1 ratio), while the second gear ratio is unitary (i.e., 1:1 ratio). For the first gear ratio, the sun gear 214 is locked to the OWC and the OWC is locked to ground. Torque from the motor 202 and clutch shaft 206 is transferred to the carrier 220 and then to the ring gear 218 via the planetary gears 216. The rotation of the ring gear 218 is then transferred to the first drive gear 228 via torque transfer component 217 to cause a rotation of the first drive gear 228. The torque is thus transferred to the drive shaft 232 via the first drive gear 228 and second drive gear 230. The torque along the drive shaft 232 is an output torque that is used to rotate an associated axle 234 at a selected axle speed.

In the second gear ratio, the second clutch 224 is engaged, locking the carrier 220 to the ring gear 218. The torque from the motor 202 is provided to the carrier 220 via the clutch shaft 206, from the carrier to the ring gear 218 and then to the first drive gear 228, second drive gear 230, drive shaft 232 and associated axle 234.

A third clutch 226 is in parallel with the first clutch 222 along the clutch shaft 206. The third clutch 226 can be locked to allow transfer of torque from the wheels of the vehicle to the motor 202 (in a "negative" direction). When both the second clutch 224 and the third clutch 226 are disengaged, the OWC can rotate with the associated axle 234 while the motor 202 is shut off.

Figure 3:
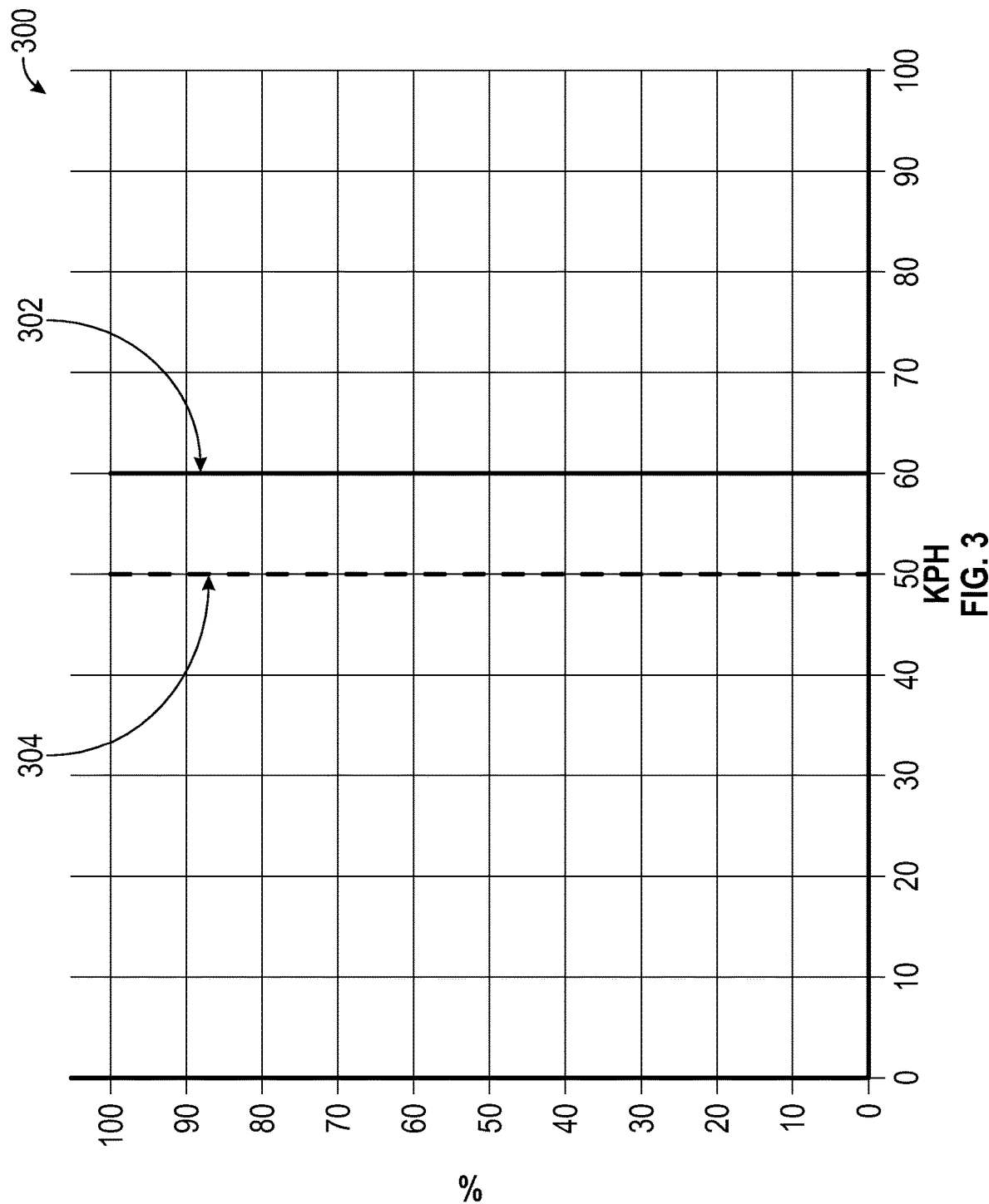
FIG. 3 shows a graph illustrating shifting schedules for a motor of the electrical vehicle of FIG. 1.

FIG. 3 shows a graph 300 illustrating shifting schedules for a motor of the electrical vehicle of FIG. 1. Vehicle speed is shown along the abscissa in kilometers per hour (kph) and accelerator pedal position is shown along the ordinate axis as a percentage. A percentage of 0% means that the accelerator pedal is all the way up (i.e., no throttle). A percent of 100% means that the accelerator pedal is pushed all the way down (i.e., full throttle). The shifting schedules includes an upshift threshold 302 and a downshift threshold 304.

The transmission of the vehicle switches from a low gear to a high great when the speed of the vehicle crosses the upshift threshold 302 with increasing velocity. The upshift threshold 302 is a vertical line located at an upshift speed. For illustrative purposes, the upshift threshold 302 is located at an upshift speed of 60 kph. Due to the vertical nature of the upshift threshold 302, the transmission upshifts based on the speed of the vehicle, regardless of the position of the accelerator pedal.

Similarly, the transmission switches from a high gear to a low gear when the speed of the vehicle crosses the downshift threshold 304 with decreasing velocity. The downshift threshold 304 is a vertical line located at a downshift speed, which is 50 kph for illustrative purposes. While the values upshift speed and the downhole speed can be set by a manufacturer, the upshift speed is greater than the downshift speed. Due to the vertical nature of the downshift threshold 304, the transmission downshifts based on the speed of the vehicle, regardless of the position of the accelerator pedal.

Figure 4:
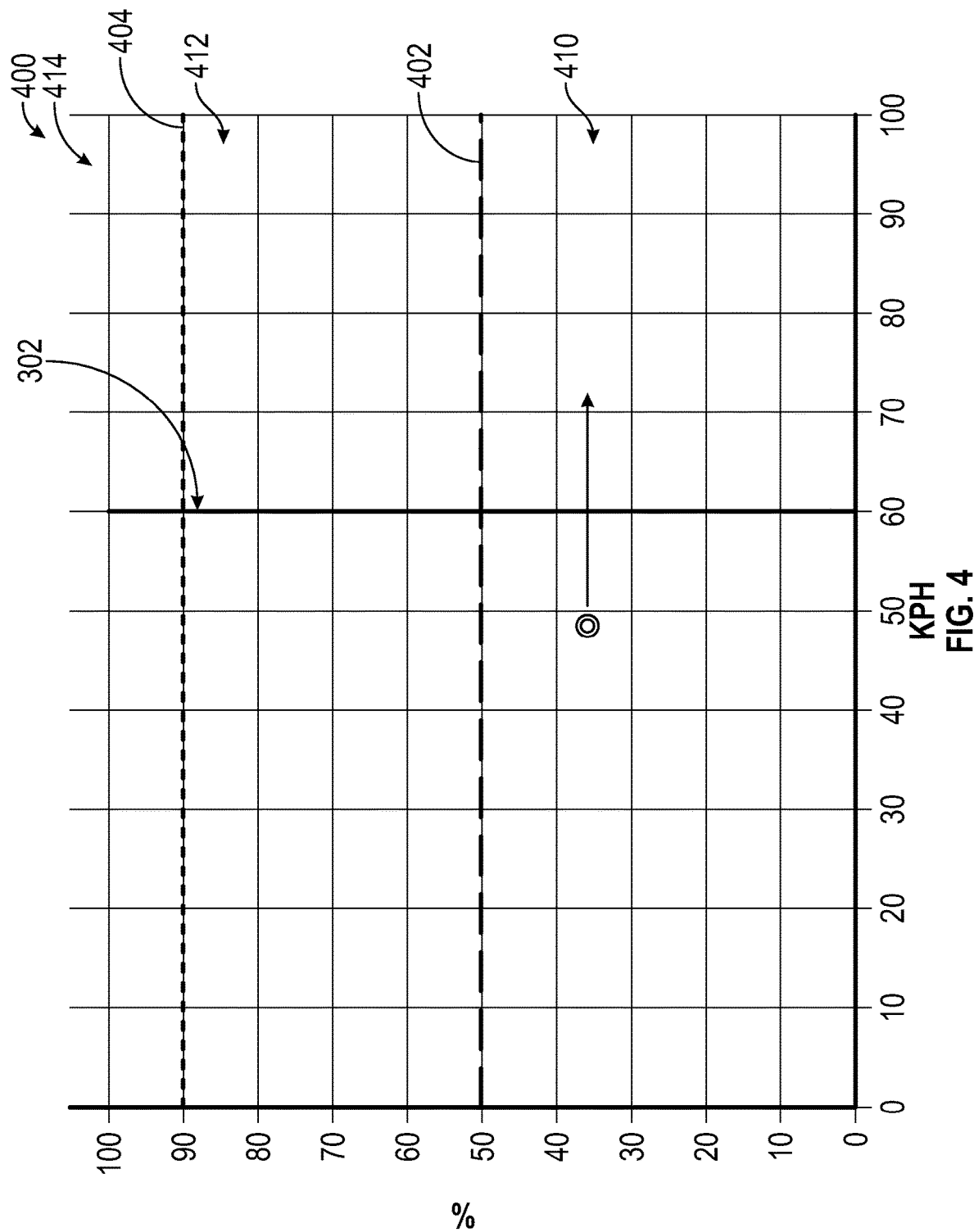
FIG. 4 shows a graph depicting an upshifting schedule for the vehicle.

FIG. 4 shows a graph 400 depicting an upshifting schedule for the vehicle. The graph 400 is partitioned into different regions and represents different modes of upshifting. The regions are separated based on accelerator pedal position. A first pedal threshold 402 separates a first region 410 from a second region 412. A second pedal threshold 404 separates the second region 412 from a third region 414. For illustrative purposes, the first pedal threshold 402 is located at a pedal position of 50% and the second pedal threshold 404 is located at a pedal position of 90%.

In the first region 410, the gear upshift occurs using a first mode of operation in which the motor torque load at the first motor (e.g., the rear motor 116) can be entirely offloaded to the second motor (e.g., the front motor 126) prior to the gear shifting. In the second region 412, the gear upshift occurs using a second mode of operation in which some but not all of the motor torque of the first motor can be offloaded to the second motor. In the third region 414, the gear upshift occurs using a third mode of operation. In the third mode, both motors are operating at full motor torque. Thus, the second motor is unavailable to receive any torque form the first motor.

Figure 5:
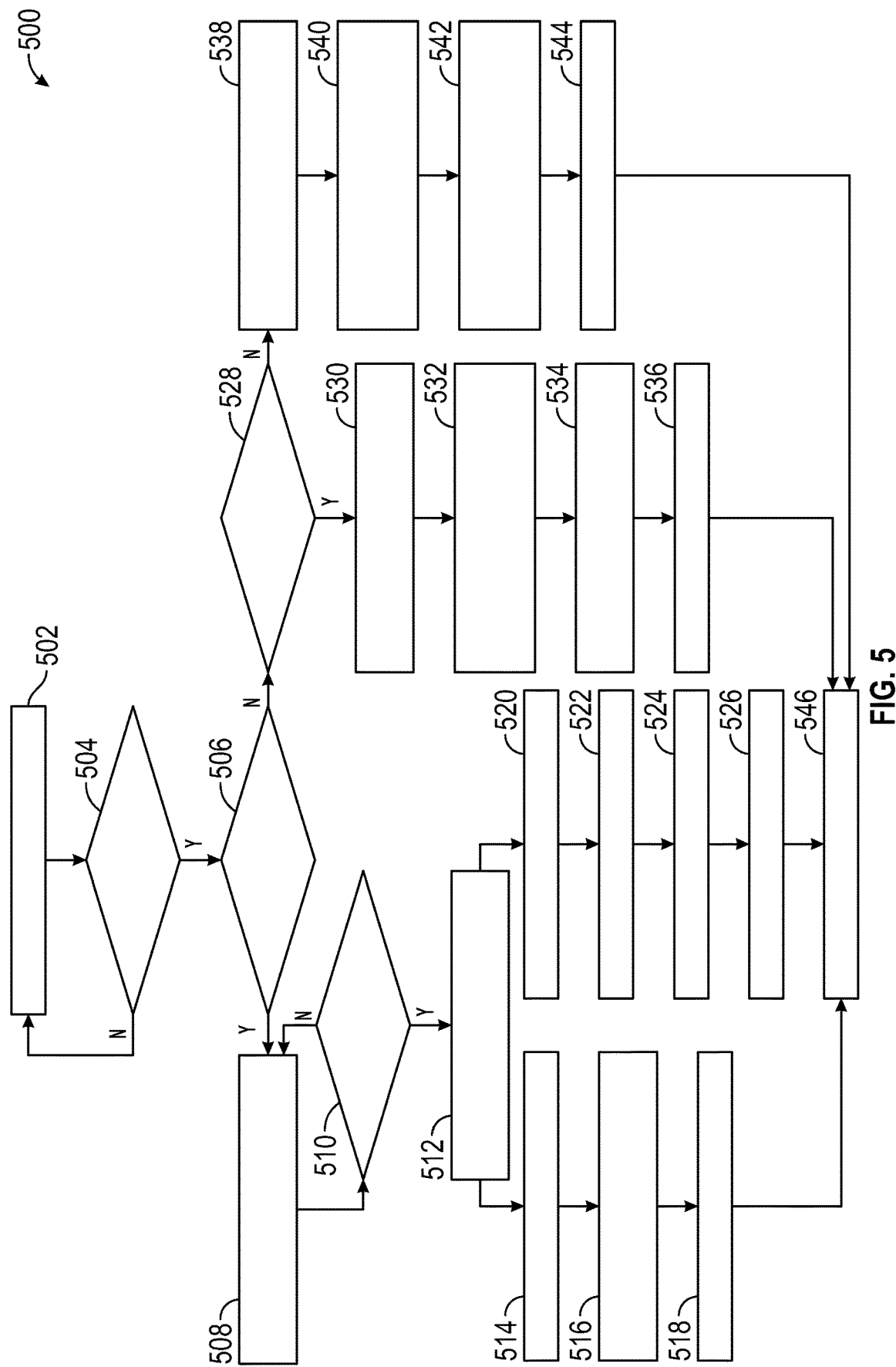
FIG. 5 shows a flowchart of an upshift strategy for a transmission, in an illustrate embodiment.

FIG. 5 shows a flowchart 500 of an upshift strategy for a transmission, in an illustrative embodiment. The strategy begins at box 502. In box 502, the operational state of the electric vehicle 100 is monitored to determine vehicle speed, accelerator pedal position, etc., as well as whether a transmission torque request is received. In box 504, the vehicle speed is compared to the upshift threshold 302 (FIG. 4). If the vehicle speed is less than the upshift threshold 302 (FIG. 4), the method loops back into box 502. Returning to box 504, when the vehicle speed is greater than the upshift threshold 302 (FIG. 4), the method proceeds to box 506. In box 506, the position of the accelerator pedal is compared to the first pedal threshold 402 in order to select an upshift mode of operation. If the position of the accelerator pedal is less than or equal to the first pedal threshold 402 (FIG. 4), the method proceeds to box 508 to proceed with gear shifting in the first mode of operation (i.e., first region 410 of FIG. 4). Returning to box 506, if the position of the accelerator pedal is greater than the first pedal threshold 402, the method proceeds to box 528.

In box 508, the motor torque of the first motor is offloaded. For illustrative purposes, the first motor is the rear motor 116. The motor torque can be offloaded to the OWC of the rear transmission, in an embodiment. In box 510, the motor torque is compared to a torque threshold. If the motor torque of the rear motor is greater than or equal to a torque threshold, the method loops back to 508 in order to offload more motor torque. If, in box 510, the motor torque of the rear motor is less than the torque threshold, the method proceeds to box 512. In box 512, an upshift strategy is selected. The upshift strategy can be either a "shift through neutral" strategy or "shift through clutch" strategy, based on a desired shift speed. A slow shift speed can be performed using "shift through neutral" while a faster shift speed can be performed using "shift through clutch." If the "shift through neutral" strategy is selected, the method proceeds to box 514. If the "shift through clutch" strategy is selected, the method proceeds to box 520.

Referring first to the "shift through neutral" strategy, in box 514, the off-going clutch is released. In box 516, the motor speed of the rear motor is decreased to a target speed for gear shifting. The motor speed can be decreased either by allowing the motor to decelerate or, alternatively, by harvesting regenerative energy from the rear axle. In box 518, the oncoming clutch is engaged and locked. From box 518, the method proceeds to box 546 in which the upshift process ends.

Referring now to the "shift through clutch" strategy, in box 520, the off-going clutch is released. In box 522, the oncoming clutch is applied to synchronize the speeds of the first motor with the inertial components of the transmission. In box 524, the motor torque of the rear motor is applied. In box 526, the oncoming clutch is engaged and locked. The method then proceeds to box 546 in which the upshift strategy ends.

Returning now to box 528, the pedal position is compared to the second threshold. If the pedal position is less than the second pedal threshold, the method proceeds to box 530 and upshifting occurs in the second mode of operation. In box 530, the first motor and the second motor (e.g., front motor 126) are managed to partially offload the motor torque from the first motor to the second motor. The offloading allows a reserved torque capacity in the first motor for use in a subsequent torque assistance procedure. In box 532, the off-going clutch is released and motor torque is managed to fully or completely fulfill the transmission torque request. In box 534, the oncoming clutch is applied and the first motor is managed to decrease a motor torque applied to the transmission to change the gear ratio. In box 536, the oncoming clutch is locked. The method then proceeds to box 546 in which the upshift procedure ends.

Returning again to box 528, if the pedal position is greater than the second pedal threshold, the method proceeds to box 538 in which a third mode of upshifting is performed. In box 538, the first motor and the second motor are managed to partially offload the motor torque from the first motor to the second motor. In box 540, the off-going clutch is released and motor torque is managed to partially fulfill the transmission torque request. In box 542, the oncoming clutch is applied and the first motor and second motor are managed to completely fulfilled the transmission torque request. In box 544, the oncoming clutch is locked. The method then proceeds to box 546 in which the upshift strategy ends.

Figure 6:
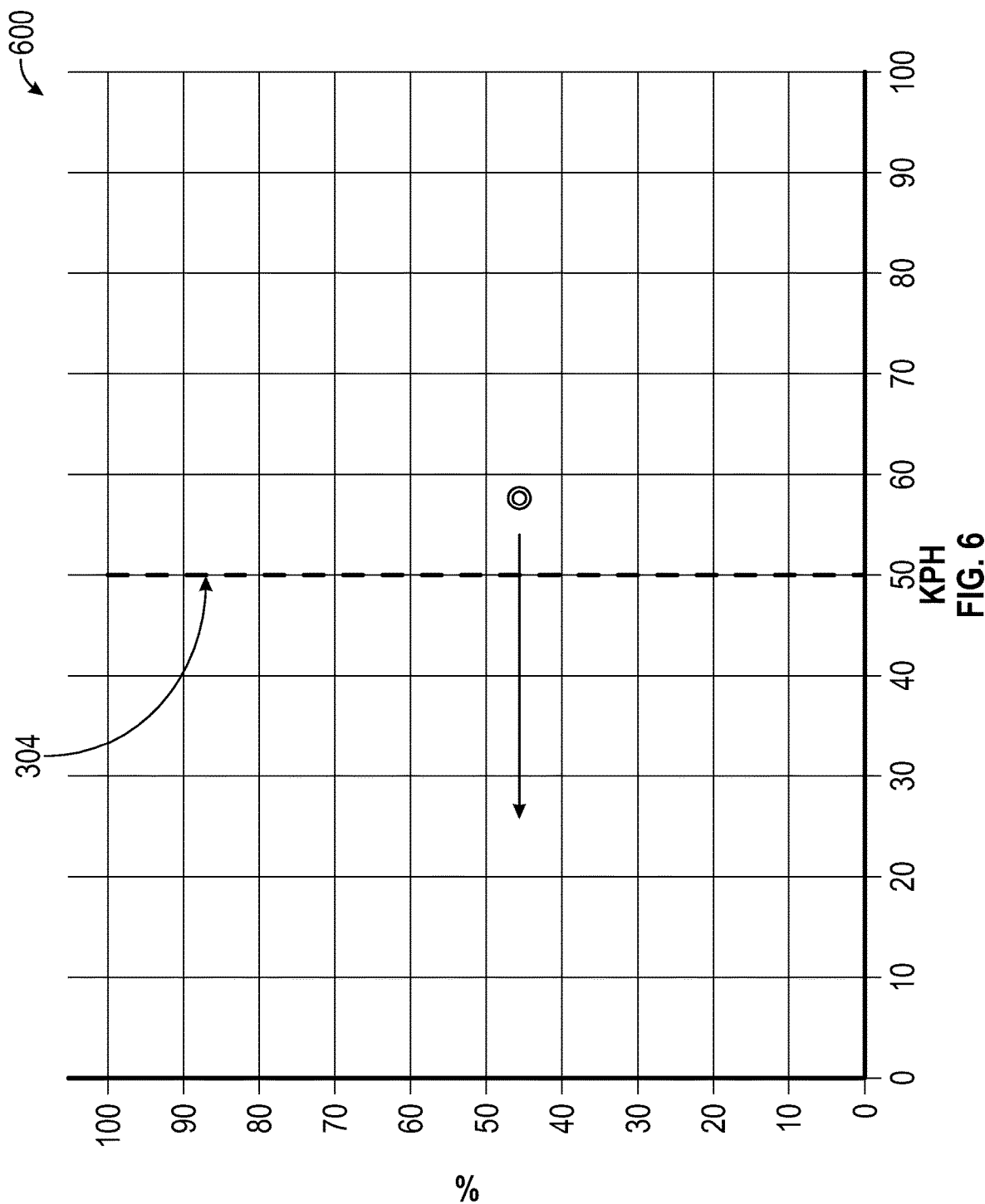
FIG. 6 shows a graph of a downshifting schedule for the vehicle.

FIG. 6 shows a graph 600 of a downshifting schedule for the vehicle. Downshift threshold 304 is shown. Unlike graph 400, the downshift schedule is not partitioned into regions of different modes of operation based on pedal position.

Figure 7:
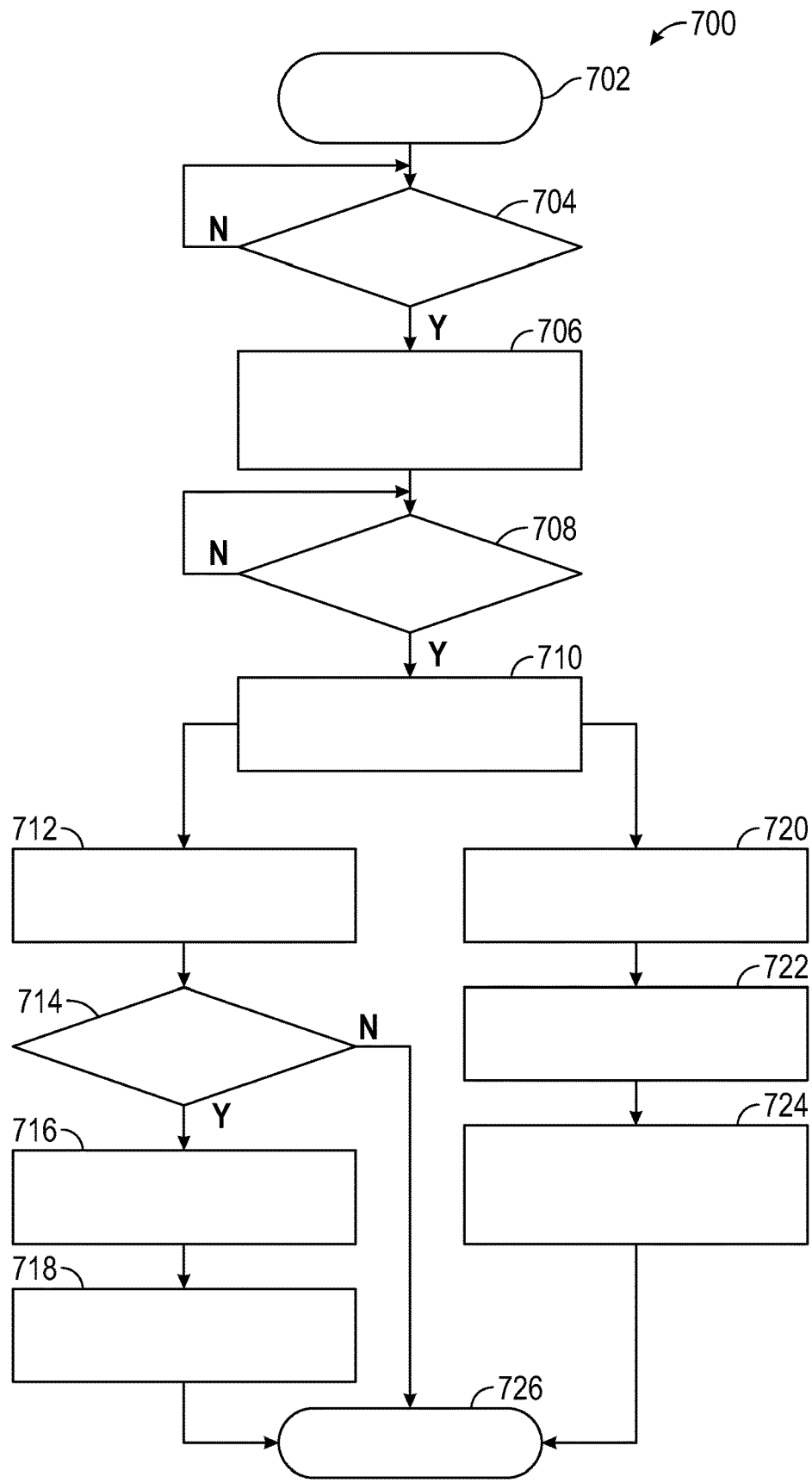
FIG. 7 shows a flowchart of a downshifting strategy for the vehicle, in an embodiment.

FIG. 7 shows a flowchart 700 of a downshifting strategy for the vehicle, in an embodiment. The strategy begins at box 702. In box 702, the operational state of the electric vehicle 100 is monitored to determine vehicle speed, accelerator pedal position, etc. In box 704, the vehicle speed is compared to the downshift threshold 304. If the vehicle speed is greater than the downshift threshold 304, the method loops back to box 702. Returning to box 704, when the vehicle speed is less than the downshift threshold 304, the method proceeds to box 706. The vehicle speed can pass through the downshift threshold 304 while the vehicle is coasting (no acceleration pedal being applied) or when the brakes are applied. In a corner case, such when the vehicle is going uphill, the vehicle speed can also decelerate through the downshift threshold 304, even if the acceleration pedal is being applied. In box 706, the motor torque is offloaded from the first motor to the second motor. The motor torque is triggered into be offloaded based only on the speed of the vehicle. In box 708, the motor torque of the first motor is compared to a torque threshold. If the motor torque is greater than or equal to the torque threshold, the method loops back to box 706. If the motor torque is less than the torque threshold, the method proceeds to box 710. In box 710, a downshift strategy is selected using, for example, a shift speed as a criterion for selection. The selected downshift strategy can be either a "shift through neutral" strategy, in which case, the method proceeds to box 712, or a "shift through clutch" strategy, in which case the method proceeds to box 720.

Referring first to the "shift through neutral" strategy, in box 712, the off-going clutch is released. Since the downshift occurs while coasting or braking, the "shift through neutral" strategy can occur with zero torque on the motor. In the corner case, there may be torque on the motor. In box 714, a determination is made of whether motor regeneration is needed. If no motor regeneration is needed, the method proceeds to box 726, in which the downshift is completed. If motor regeneration is needed, the method proceeds to box 716. In box 716, the motor speed of the rear motor is increased to a target speed for gear shifting. In box 718, the oncoming clutch is engaged and locked. From box 718, the method proceeds to box 726 in which the downshift procedure ends.

Referring now to the "shift through clutch" strategy, in box 720, the oncoming clutch is applied in order to synchronize the speed of the first motor with the transmission speed. In box 722, the motor torque of the rear motor is adjusted. In box 724, the oncoming clutch is locked. The rear motor is then ready for regeneration when the clutch is locked. The method then proceeds to box 726 in which the downshift procedure ends.

Figure 8:
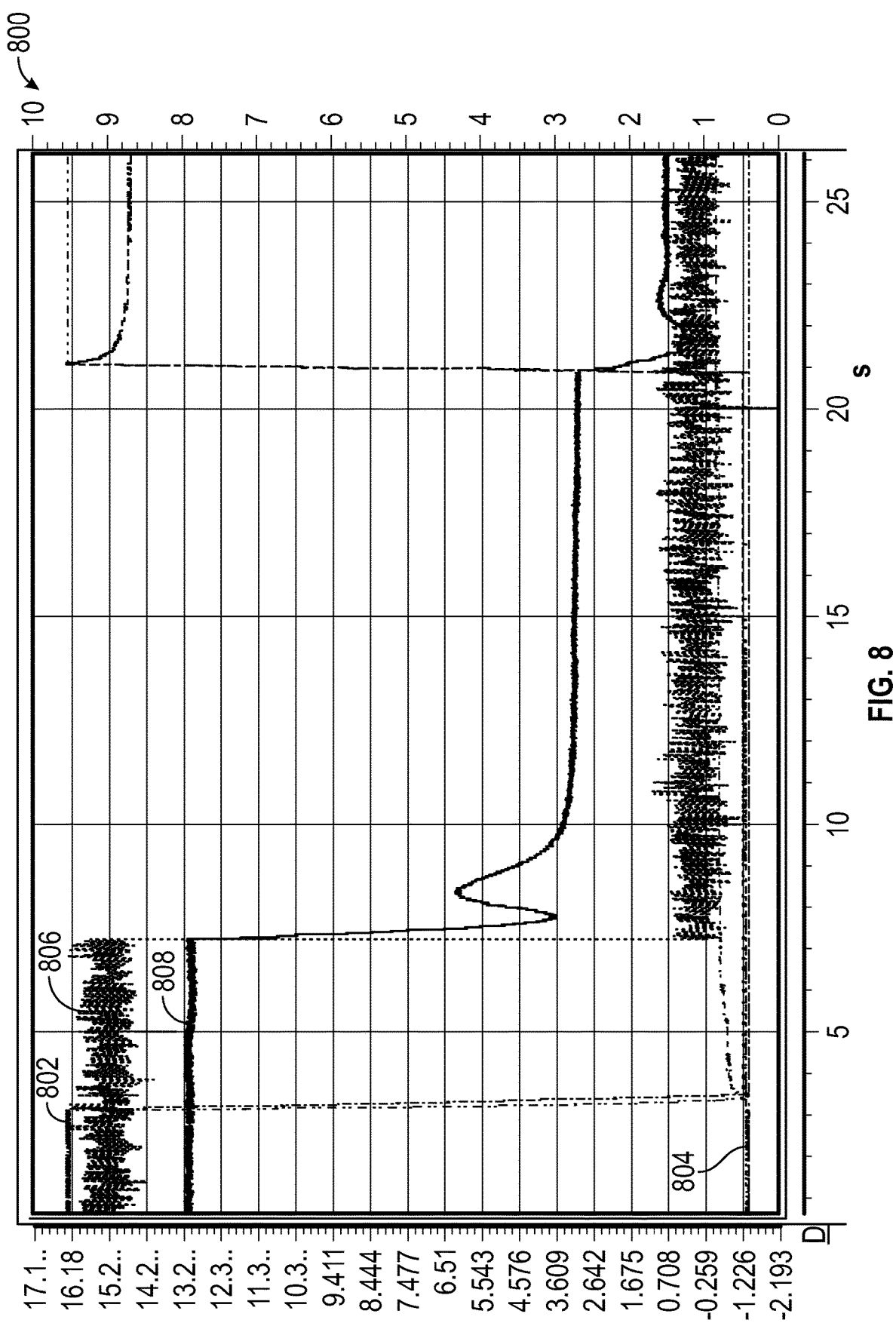
FIG. 8 shows a graph of various parameters during an upshift operation, in an illustrative embodiment.

FIG. 8 shows a graph 800 of various parameters during an upshift operation, in an illustrative embodiment. Curve 802 represents a first clutch, and curve 804 represents a second clutch. When either of curve 802 and curve 804 is high, the respective clutch is engaged, and when the curve is low, the respective clutch is disengaged. Curve 806 represents a motor torque and curve 808 represents the motor speed.

During the upshift procedure, the first clutch (curve 802) is an off-going clutch and is released. The motor torque (curve 806) subsequently drops from a high torque to a low torque. The motor speed (curve 808) drops from a high speed to an intermediate speed. The second clutch (curve 804) is then locked, causing the motor speed (curve 808) to drop to a low speed.

Figure 9:
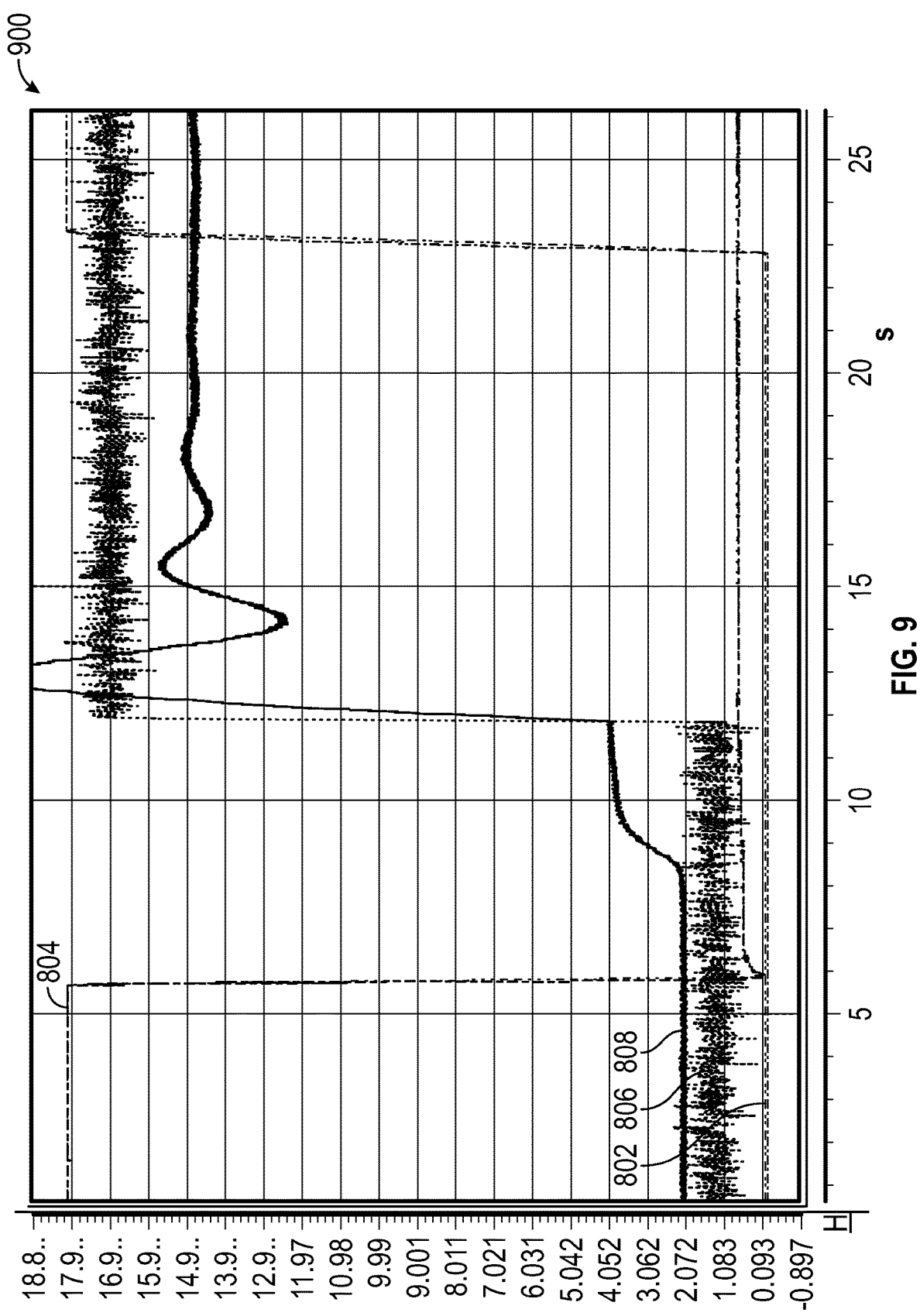
FIG. 9 shows a graph of the various parameters during a downshift operation, in an illustrative embodiment.

FIG. 9 shows a graph 900 of the various parameters during a downshift operation, in an illustrative embodiment. During the downshift procedure, the second clutch (curve 804) is released. The motor torque (curve 806) consequently rises from a low torque to a high torque. The motor speed (curve 808) rises from a low speed to a high speed. The first clutch (curve 802) is then locked.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating an electric vehicle, comprising: performing a gear shift at a transmission of the electric vehicle when a speed of the electric vehicle crosses a shift threshold, wherein the shift threshold is independent of a position of an acceleration pedal of the electric vehicle, wherein the transmission is associated with a first motor of the electric vehicle, wherein performing the gear shift further comprises performing one of an upshift in a first mode when the position of the acceleration pedal is less than a first pedal threshold, a second mode when the position of the acceleration pedal is greater than the first pedal threshold and less than a second pedal threshold, and a third mode when the position of the acceleration pedal is greater than the second pedal threshold, wherein the first mode further includes offloading torque entirely from the first motor to a second motor, the second mode includes offloading some but not all torque from the first motor to the second motor, and the third mode includes no offloading of torque.

2. The method of claim 1, wherein the shift threshold further comprises an upshift threshold defining an upshift speed and a downshift threshold defining a downshift speed that is less than the upshift speed.

3. The method of claim 1, further comprising performing the upshift in the first mode using one of: (i) shifting through neutral; and (ii) shifting through clutch.

4. The method of claim 1, further comprising performing a downshift by shifting through neutral with no torque at the first motor.

5. The method of claim 4, wherein performing the downshift further comprises shifting through neutral includes using regenerative braking.

6. The method of claim 1, wherein the first pedal threshold is at 50% of full throttle and the second pedal threshold is at 90% of full throttle.

7. The method of claim 1, wherein the first motor is coupled to a rear axle of the electric vehicle and the second motor is coupled to a front axle of the electric vehicle.

8. A system for operating an electric vehicle, comprising:
a first motor; and
a transmission coupled to the first motor configured to shift gears when a speed of the electric vehicle crosses a shift threshold, wherein the shift threshold is independent of a position of an acceleration pedal of the electric vehicle, wherein the transmission is configured to perform an upshift in one of a first mode when the position of the acceleration pedal is less than a first pedal threshold, a second mode when the position of the acceleration pedal is greater than the first pedal threshold and less than a second pedal threshold, and a third mode when the position of the acceleration pedal is greater than the second pedal threshold, wherein the first mode includes offloading torque entirely from the first motor to a second motor, the second mode includes offloading some but not all torque from the first motor to the second motor, and the third mode includes no offloading of torque.

9. The system of claim 8, wherein the shift threshold further comprises an upshift threshold defining an upshift speed and a downshift threshold defining a downshift speed that is less than the upshift speed.

10. The system of claim 8, wherein the transmission is further configured to perform the upshift in the first mode using one of:
(i) shifting through neutral; and (ii) shifting through clutch.

11. The system of claim 8, wherein the transmission is further configured to perform a downshift by shifting through neutral with no torque at the first motor.

12. The system of claim 11, wherein the transmission is further configured to perform the downshift by shifting through neutral using regenerative braking.

13. The system of claim 8, wherein the first pedal threshold is at 50% of full throttle and the second pedal threshold is at 90% of full throttle.

14. The system of claim 8, wherein the first motor is coupled to a rear axle of the electric vehicle and the second motor is coupled to a front axle of the electric vehicle.

15. An electric vehicle, comprising:
a first motor; and
a transmission coupled to the first motor configured to shift gears when a speed of the electric vehicle crosses a shift threshold, wherein the shift threshold is independent of a position of an acceleration pedal of the electric vehicle, wherein the transmission is configured to perform an upshift in one of a first mode when the position of the acceleration pedal is less than a first pedal threshold, a second mode when the position of the acceleration pedal is greater than the first pedal threshold and less than a second pedal threshold, and a third mode when the position of the acceleration pedal is greater than the second pedal threshold, wherein the first mode includes offloading torque entirely from the first motor to a second motor, the second mode includes offloading some but not all torque from the first motor to the second motor, and the third mode includes no offloading of torque.

16. The electric vehicle of claim 15, wherein the shift threshold further comprises an upshift threshold defining an upshift speed and a downshift threshold defining a downshift speed that is less than the upshift speed.

17. The electric vehicle of claim 15, wherein the transmission is further configured to perform the upshift in the first mode using one of: (i) shifting through neutral; and (ii) shifting through clutch.

18. The electric vehicle of claim 15, wherein the transmission is further configured to perform a downshift by shifting through neutral with no torque at the first motor.

19. The electric vehicle of claim 15, wherein the first pedal threshold is at 50% of full throttle and the second pedal threshold is at 90% of full throttle.

20. The electric vehicle of claim 15, wherein the first motor is coupled to a rear axle of the electric vehicle and the second motor is coupled to a front axle of the electric vehicle.

* * * * *